United States Patent
John (10) Patent No.: US 10,663,079 B2
(45) Date of Patent: May 26, 2020

(54) ELECTRO-PNEUMATIC VALVE WITH PRESSURIZED CONTAINER

(71) Applicant: Goodrich Corporation, Charlotte, NC (US)

(72) Inventor: Poly Puthur John, Karnataka (IN)

(73) Assignee: GOODRICH CORPORATION, Charlotte, NC (US)

( * ) Notice: Subject to any disclaimer, the term of this patent is extended or adjusted under 35 U.S.C. 154(b) by 131 days.

(21) Appl. No.: 15/844,046

(22) Filed: Dec. 15, 2017

(65) Prior Publication Data

US 2019/0120404 A1   Apr. 25, 2019

(30) Foreign Application Priority Data

Oct. 20, 2017   (IN) .............................. 201711037204

(51) Int. Cl.
| | |
|---|---|
| F16K 31/40 | (2006.01) |
| F16K 31/06 | (2006.01) |
| F16K 31/42 | (2006.01) |
| F16K 1/30 | (2006.01) |
| B64D 25/14 | (2006.01) |
| B60C 29/00 | (2006.01) |
| B63C 9/18 | (2006.01) |

(Continued)

(52) U.S. Cl.
CPC ............ *F16K 31/406* (2013.01); *F16K 1/302* (2013.01); *F16K 31/0627* (2013.01); *F16K 31/42* (2013.01); *A62B 1/00* (2013.01); *B63C 9/1255* (2013.01); *B63C 9/18* (2013.01); *B63C 9/24* (2013.01); *B63C 2009/042* (2013.01); *B64D 25/14* (2013.01)

(58) Field of Classification Search
None
See application file for complete search history.

(56) References Cited

U.S. PATENT DOCUMENTS

| | | | |
|---|---|---|---|
| 5,921,832 A | 7/1999 | Thiermann | |
| 2001/0023931 A1* | 9/2001 | Fukano | .............. G05D 16/2024 |
| | | | 251/129.15 |

(Continued)

FOREIGN PATENT DOCUMENTS

| | | |
|---|---|---|
| CN | 203142996 U | 8/2013 |
| CN | 105539864 A | 5/2016 |

(Continued)

OTHER PUBLICATIONS

European Search Report for Application No. 18200489.5-1015, dated Mar. 1, 2019, 7 pages.

*Primary Examiner* — Jessica Cahill
*Assistant Examiner* — Daphne M Barry
(74) *Attorney, Agent, or Firm* — Cantor Colburn LLP (57) ABSTRACT

An electro-pneumatic valve assembly includes a valve having a valve housing and a poppet and a solenoid valve having an actuator housing and a valve body. The valve housing has a wall that defines a valve inlet that is arranged to receive a fluid flow from a pressurized container and defines a valve outlet and a first port. The poppet is disposed within the valve housing and is movable between a first position and a second position. The actuator housing defines an opening. The valve body has a first wall that defines an inlet that is fluidly connected to the first port and a second wall that defines an outlet that is fluidly connected to the second port.

15 Claims, 4 Drawing Sheets

(51) Int. Cl.
*A62B 1/00* (2006.01)
*B63C 9/125* (2006.01)
*B63C 9/04* (2006.01)

(56) References Cited

U.S. PATENT DOCUMENTS

| | | |
|---|---|---|
| 2009/0038697 A1 | 2/2009 | Cho et al. |
| 2012/0012190 A1 | 1/2012 | Barber |

FOREIGN PATENT DOCUMENTS

| | | |
|---|---|---|
| DE | 3741521 C1 | 2/1989 |
| DE | 202010001007 U1 | 5/2011 |
| FR | 2343951 A1 | 10/1977 |
| FR | 2386753 A2 | 11/1978 |
| FR | 2686679 A1 | 7/1993 |

\* cited by examiner

ELECTRO-PNEUMATIC VALVE WITH PRESSURIZED CONTAINER

CROSS-REFERENCES TO RELATED APPLICATIONS

This patent application claims priority to Indian Provisional Patent Application No. 201711037204, filed Oct. 20, 2017, which is incorporated herein by reference in its entirety.

BACKGROUND

Exemplary embodiments pertain to the art of inflation valves.

Inflation valves may be used in conjunction with a high pressure stored gas that is controllably released to inflate an object such as a raft, lifejacket, emergency slide, or the like. Inflation valves may be flow isolation valves actuated by electrical or mechanical arrangements but are typically single opening action valves meaning that they may only be used one time. Accordingly, it is desirable to provide an inflation valve that may be repeatedly used.

BRIEF DESCRIPTION

Disclosed is an electro-pneumatic valve assembly that includes a valve. The valve includes a valve housing, and a poppet. The valve housing has a wall that extends along a first axis between a first end and a second end and an end wall that is disposed at the second end. The wall defines a valve outlet and a first port and the end wall defines a second port. The poppet is slidably disposed within the valve housing. The poppet is movable between a first position that inhibits a fluid flow through the valve outlet and a second position that facilitates the fluid flow through the valve outlet.

In addition to one or more of the features described herein, the wall defines a first shoulder that extends towards the first axis.

In addition to one or more of the features described herein, a valve inlet is defined by the first shoulder and is arranged to receive the fluid flow from a pressurized container.

In addition to one or more of the features described herein, the valve housing defines an inlet chamber that extends between the first end and the first shoulder.

In addition to one or more of the features described herein, the wall defines a second shoulder that extends away from the first axis and is spaced apart from the first shoulder.

In addition to one or more of the features described herein, the valve housing defines a first chamber that extends between the first shoulder and the second shoulder.

In addition to one or more of the features described herein, the valve housing defines a second chamber that extends between the end wall and the second shoulder.

In addition to one or more of the features described herein, the first chamber has a first diameter and the second chamber has a second diameter that is greater than the first diameter.

In addition to one or more of the features described herein, the poppet includes a poppet head that is slidably received within the second chamber and a poppet body that extends from the poppet head and is slidably received within the first chamber.

In addition to one or more of the features described herein, the electro-pneumatic valve assembly further includes a solenoid valve. The solenoid valve has an inlet that is fluidly connected to the first port, an outlet that is fluidly connected to the second port, and a vent port. The solenoid valve is movable between an open position and a closed position.

In addition to one or more of the features described herein, while in the open position the fluid flow from the pressurized container flows through the first port, through the inlet, through the outlet, through the second port and into the second chamber to urge the poppet towards the first position.

In addition to one or more of the features described herein, while in the closed position the fluid flow from the pressurized container that is disposed within the second chamber flows through the second port, through the outlet, and through the vent port to facilitate the fluid flow from the pressurized container through the valve inlet to urge the poppet towards the second position.

Also disclosed is an electro-pneumatic valve assembly that includes a solenoid valve. The solenoid valve includes an actuator housing, a valve body, and a plunger assembly. The actuator housing has a base that defines an opening that extends along an axis and a cover assembly that is connected to the base and defines a first cavity that is disposed about the axis. The valve body has a first wall that defines an inlet that is disposed about the axis, a second wall that extends from the first wall and defines an outlet, and a flange that extends from the second wall and engages the base. The plunger assembly is movable along the axis between an open position that facilitates a fluid flow through the inlet and through the outlet and a closed position that inhibits the fluid flow through the inlet and the outlet.

In addition to one or more of the features described herein, the second wall has a body shoulder that extends towards the axis and defines a central opening that is disposed about the axis.

In addition to one or more of the features described herein, the valve body defines a valve cavity that extends between the first wall and the body shoulder.

In addition to one or more of the features described herein, the valve body defines a vent cavity that extends between the body shoulder and the flange.

In addition to one or more of the features described herein, the second wall defines a vent port that is disposed between the body shoulder and the flange.

In addition to one or more of the features described herein, the plunger assembly includes a plunger extending between a first plunger end and a second plunger end along the axis and a push rod connected to the first plunger end and extending through the opening and the central opening.

In addition to one or more of the features described herein, the push rod has a head that engages the body shoulder to fluidly seal the central opening while the plunger assembly is in the open position and that engages a portion of the first wall to fluidly seal the inlet while the plunger assembly is in the closed position.

In addition to one or more of the features described herein, the head includes a skirt that extends towards and engages the second wall.

In addition to one or more of the features described herein, the solenoid valve includes a first biasing member that is disposed within the valve cavity and extends between the first wall and the skirt.

In addition to one or more of the features described herein, the solenoid valve includes a cap that is disposed opposite the base such that the plunger is disposed between the base and the cap.

In addition to one or more of the features described herein, the solenoid valve includes a second biasing member that is disposed within a second cavity that is defined between the second plunger end and the cap.

In addition to one or more of the features described herein, the electro-pneumatic valve assembly includes a valve having a first port that is fluidly connected to the inlet and a second port that is fluidly connected to the outlet.

Further disclosed is an electro-pneumatic valve assembly that includes a valve and a solenoid valve. The valve includes a valve housing and a poppet. The valve housing has a wall extending along a first axis between a first end and a second end and an end wall disposed at the second end. The wall has a first shoulder that extends towards the first axis and defines a valve inlet that is arranged to receive a fluid flow from a pressurized container. The wall defines a valve outlet and a first port. The end wall defines a second port. The poppet is disposed within the valve housing and is movable between a first position and a second position. The solenoid valve includes an actuator housing and a valve body. The actuator housing has a base that defines an opening that extends along a second axis that is disposed transverse to the first axis and a cover assembly that is connected to the base and defines a first cavity. The valve body has a first wall that defines an inlet that is fluidly connected to the first port, a second wall that extends from the first wall and defines a vent port and an outlet that is fluidly connected to the second port, and a flange that extends from the second wall and engages the base.

In addition to one or more of the features described herein, the solenoid valve includes a plunger assembly that is movable along the second axis between an open position and a closed position.

In addition to one or more of the features described herein, while the plunger assembly is in the open position, the fluid flow from the pressurized container flows through the first port, through the inlet, through the outlet, and through the second port to urge the poppet towards the first position.

In addition to one or more of the features described herein, while the plunger assembly is in the closed position the fluid flow from the pressurized container flows through the second port, through the outlet, and through the vent port to facilitate the fluid flow from the pressurized container through the valve inlet to urge the poppet towards the second position.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
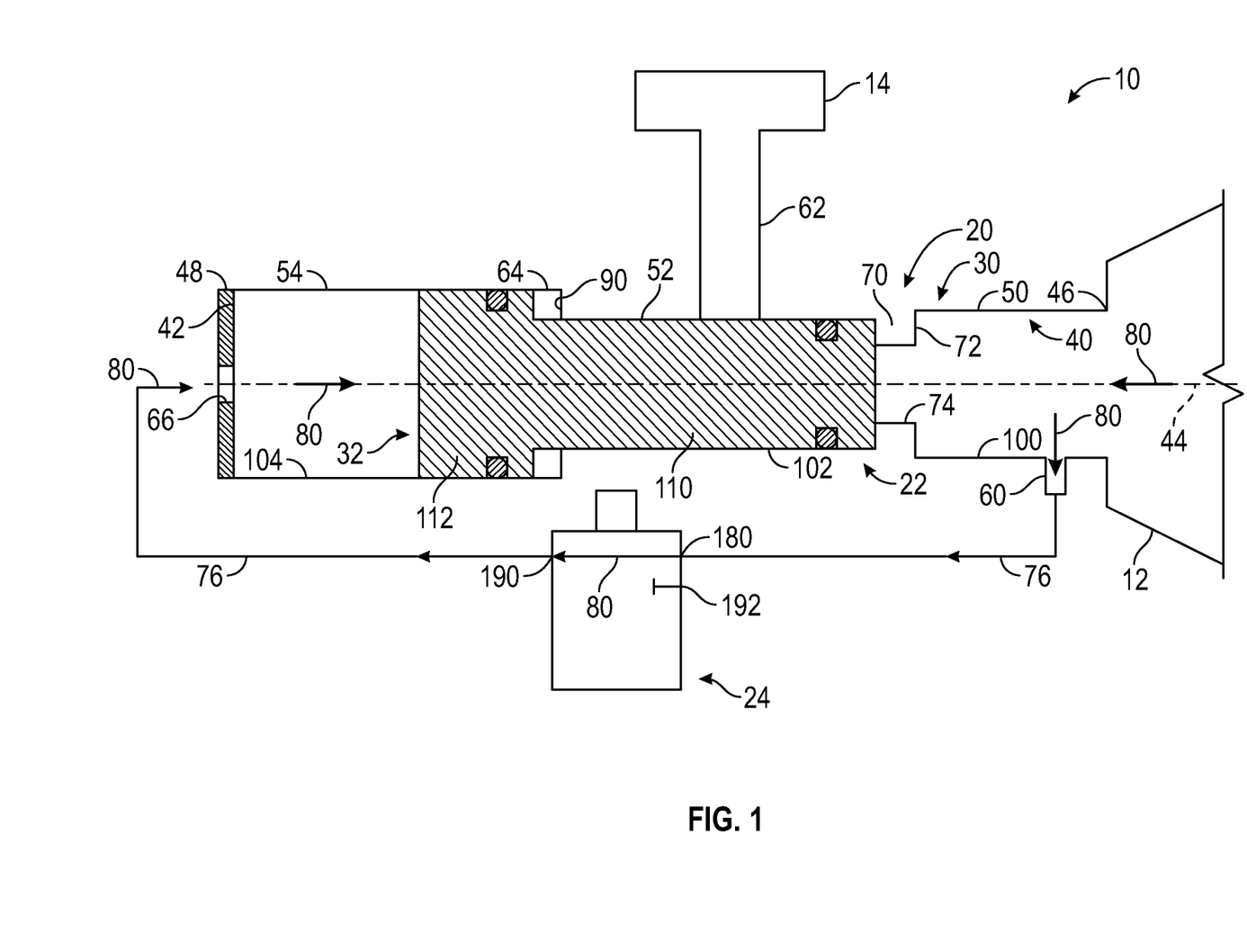
FIG. 1 is a schematic view of an inflation system having an electro pneumatic valve assembly in a closed position.
Figure 2:
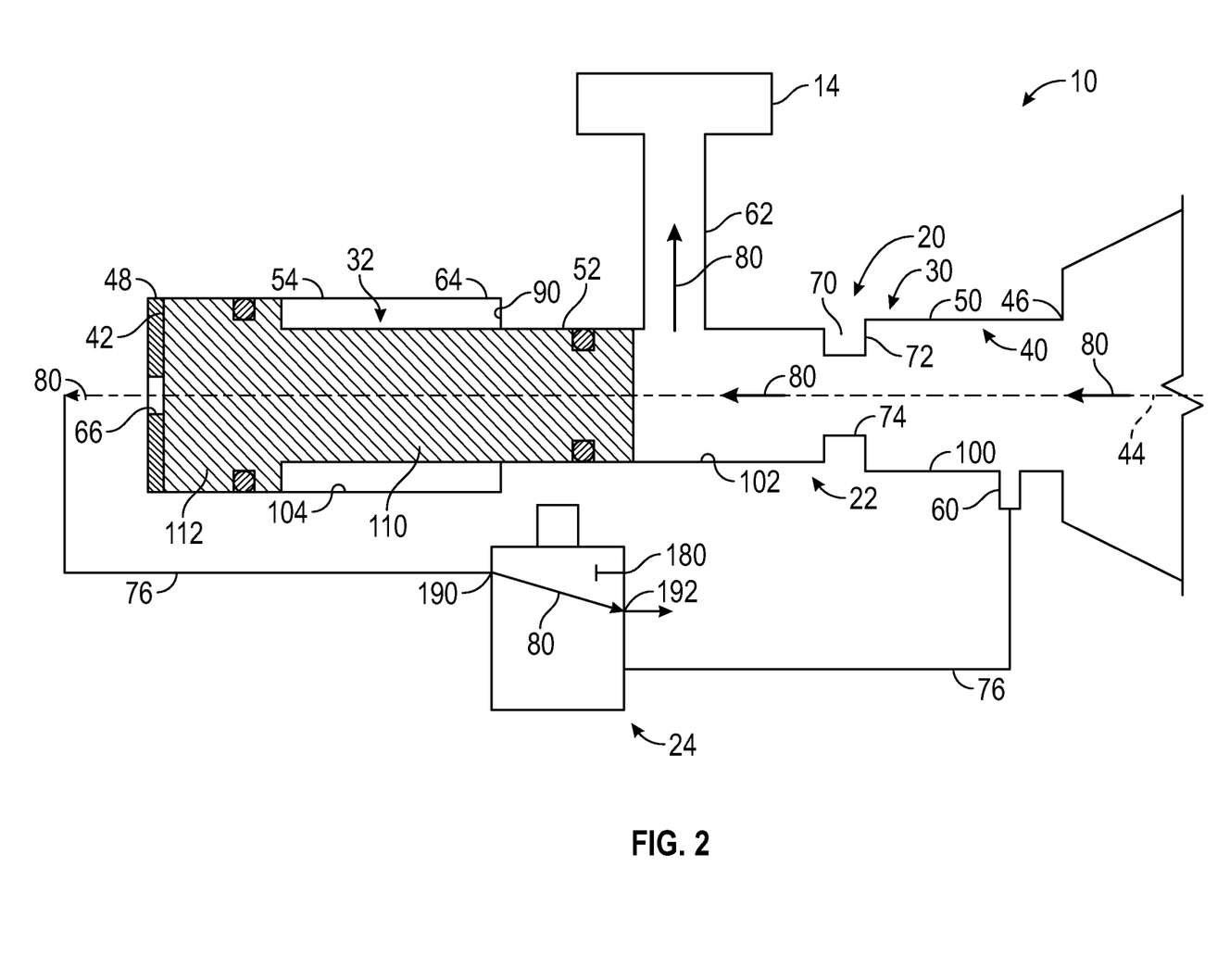
FIG. 2 is a schematic view of the inflation system having the electro-pneumatic valve assembly in an open position.

Referring to FIGS. 1 and 2, an inflation system 10 is shown. The inflation system 10 may be mounted on or connected to a pressurized container 12 having a fluid that may be provided to an apparatus 14 to be inflated. The fluid may be a pressurized fluid. The apparatus 14 may be emergency equipment such as an inflatable raft, a life vest, an emergency slide, a fire suppression system, or other inflatable devices.

The inflation system 10 includes an electro-pneumatic valve assembly 20 that may be cycled between open and closed positions and is designed with built-in test features to facilitate valve health checks at any point of time. The electro-pneumatic valve assembly 20 includes a pneumatic valve 22 and a solenoid valve 24. The pneumatic valve 22 and the solenoid valve 24 may be integrated into a single manifold or housing to reduce the size of the electro-pneumatic valve assembly 20.

The pneumatic valve 22 includes a valve housing 30 and a poppet 32 that is movably disposed within the valve housing 30.

The valve housing 30 includes a wall 40 and an end wall 42. The wall 40 extends along a first axis 44 between a first end 46 and a second end 48. The wall includes a first wall segment 50, a second wall segment 52, and a third wall segment 54 each extending along or about the first axis 44. The first wall segment 50 extends from the first end 46 towards the second wall segment 52. The second wall segment 52 extends between the first wall segment 50 and the third wall segment 54. The third wall segment 54 extends between the second wall segment 52 and the second end 48 and terminates at the end wall 42 that is disposed at the second end 48.

The first wall segment 50 of the wall defines a first port 60 that is fluidly connected to the solenoid valve 24. The second wall segment 52 of the wall defines a valve outlet 62 that is fluidly connected to the apparatus 14. The third wall segment 54 of the wall defines a leakage vent 64. The end wall 42 defines a second port 66 that is fluidly connected to the solenoid valve 24.

An extension 70 radially extends (relative to the first axis 44) from the wall towards the first axis 44 and is axially disposed (relative to the first axis 44) between the first wall segment 50 and the second wall segment 52. The extension 70 of the wall defines a first shoulder 72 that extends between the first wall segment 50 and the second wall segment 52. A distal end of the first shoulder 72 defines a valve inlet 74 that extends about the first axis 44. The valve inlet 74 is arranged to receive a fluid flow 80 from the pressurized container 12.

A feed line 76 may extend between the first port 60 and the second port 66. The solenoid valve 24 may be fluidly connected to the feed line 76.

A second shoulder 90 radially extends between the second wall segment 52 and the third wall segment 54 of the wall. The second shoulder 90 is disposed adjacent to and is axially spaced apart from the leakage vent 64.

The valve housing 30 defines an inlet chamber 100, a first chamber 102, and a second chamber 104. The inlet chamber 100 is at least partially defined by the first wall segment 50 and extends between the first end 46 and the first shoulder 72. The inlet chamber 100 is fluidly connected to the first port 60. The inlet chamber 100 is arranged to at least partially receive a portion of the pressurized container 12.

The first chamber 102 is at least partially defined by the second wall segment 52 and extends between the first shoulder 72 and the second shoulder 90. The first chamber 102 is fluidly connected to the valve outlet 62. The first chamber 102 has a first diameter, D1.

The second chamber 104 is at least partially defined by the third wall segment 54 and the end wall 42. The second chamber 104 extends between the second shoulder 90 and the end wall 42. The second chamber 104 is fluidly connected to the second port 66. The second chamber has a second diameter, D2, which is greater than the first diameter, D1.

The poppet 32 is slidably disposed within the valve housing 30 and extends between the first chamber 102 and the second chamber 104. The poppet 32 is movable between a first position that inhibits the fluid flow 80 from flowing through the valve outlet 62 and a second position that facilitates the fluid flow 80 to flow through the valve outlet 62.

The poppet 32 includes a poppet body 110 and a poppet head 112. The poppet body 110 is slidably received within the first chamber 102 and may slidably engage the second wall segment 52 of the wall. The poppet body 110 is provided with a radial seal that sealingly engages the second wall segment 52. The poppet body 110 has a first poppet diameter, P1. The poppet head 112 extends from the poppet body 110 along the first axis 44. The poppet head 112 is slidably received within the second chamber 104 and may slidably engage the third wall segment 54 of the wall. The poppet head 112 is provided with a radial seal that sealingly engages the third wall segment 54. The poppet head 112 has a second poppet diameter, P2, which is greater than the first poppet diameter, P1.

As shown in FIG. 1, an end of the poppet body 110 engages the extension 70 having the first shoulder 72 and poppet body 110 blocks the valve outlet 62, while the poppet 32 is in the first position. As shown in FIG. 2, the end of the poppet body 110 is spaced apart from the extension 70 having the first shoulder 72 and the poppet body 110 exposes the valve outlet 62, while the poppet 32 is in the second position.

Figure 3:
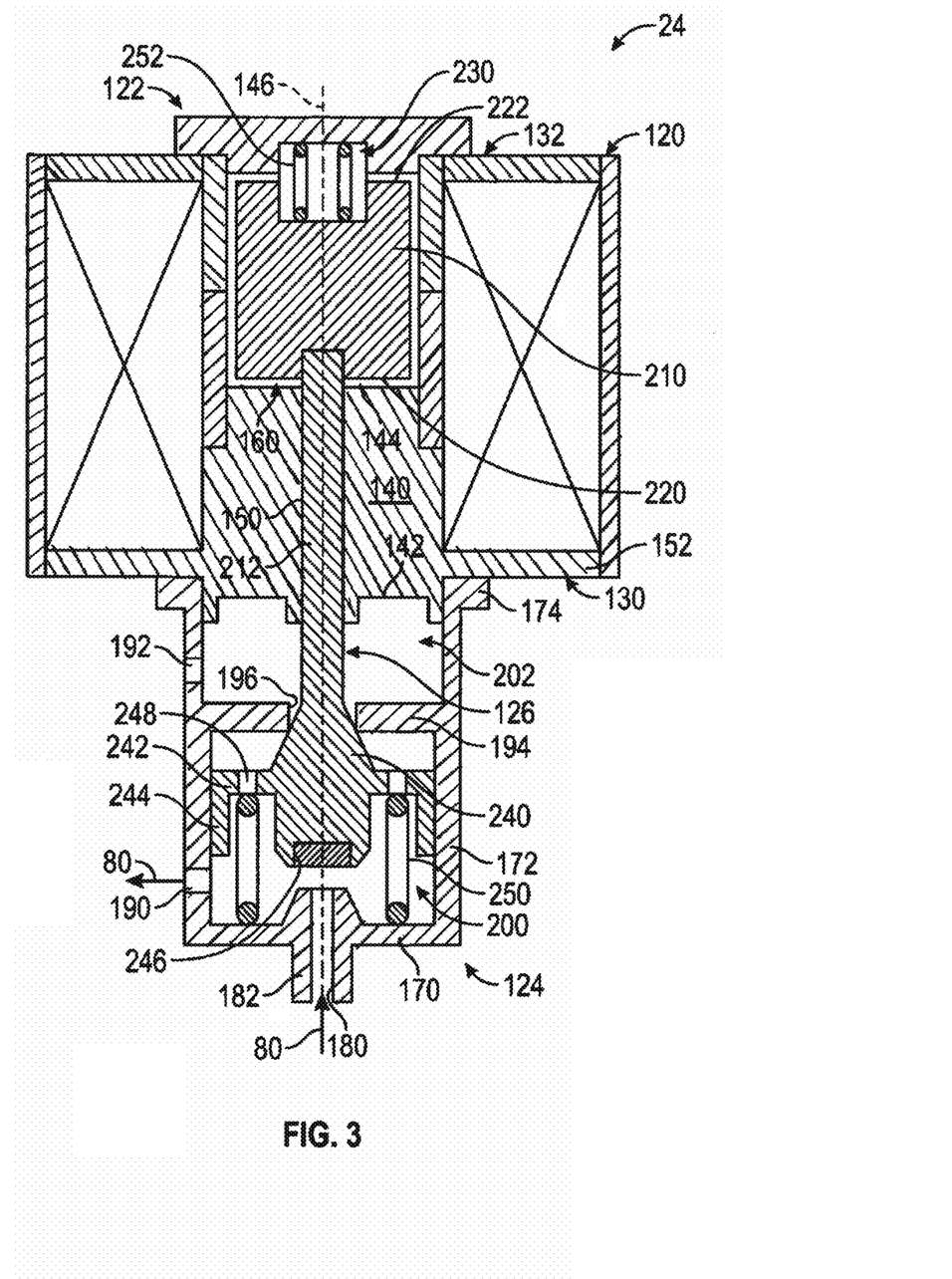
FIG. 3 is a schematic view of a solenoid valve of the electro-pneumatic valve assembly in a de-energized state.
Figure 4:
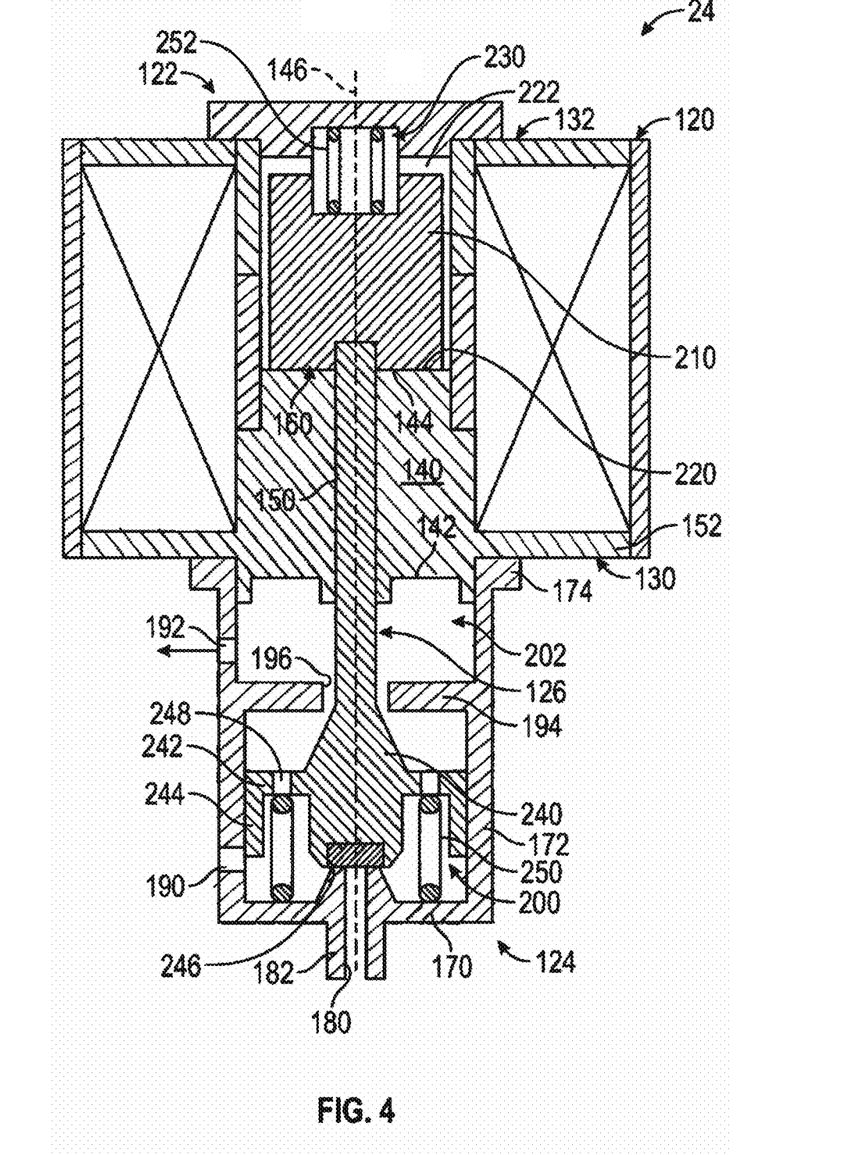
FIG. 4 is a schematic view of the solenoid valve of the electro-pneumatic valve assembly in an energized state.

The solenoid valve 24 is fluidly connected to the pneumatic valve 22 and is arranged to facilitate the poppet 32 to move between the first position and the second position along the first axis 44. The solenoid valve 24 may be configured as a two position-three way type valve that is positioned within a feed line 76 that extends between the first port 60 and the second port 66. The solenoid valve 24 is movable between an open position and a closed position, but is in an open position while the poppet 32 of the pneumatic valve 22 is in the first position. Referring to FIGS. 3 and 4, the solenoid valve 24 includes an actuator housing 120, a cap 122, a valve body 124, and a plunger assembly 126.

The actuator housing 120 includes a base 130 and a cover assembly 132 that is connected to the base 130. The base 130 includes a body 140 that extends between a first body end 142 and a second body end 144 along a second axis 146 that may be disposed transverse to the first axis 44. The body 140 may be configured as a solenoid bobbin. The body 140 defines an opening 150 that extends between the first body end 142 and the second body end 144 along the second axis 146. In at least one embodiment, the base 130 includes a base flange 152 that radially extend from the body 140 and is disposed proximate the first body end 142.

The cover assembly 132 is connected to and is at least partially disposed about the base 130. A portion of the body 140 of the base 130 extends into the cover assembly 132. A solenoid coil or a portion of an actuator is received within a region that is radially disposed between the body 140 of the base 130 and the cover assembly 132.

The cap 122 is disposed opposite the base 130 and is operatively connected the cover assembly 132. The cap 122 at least partially extends into the cover assembly 132. A first cavity 160 is defined between the cap 122, a portion of the cover assembly 132, and the second body end 144.

The valve body 124 is operatively connected to the base 130 of the actuator housing 120. The valve body 124 includes a first wall 170, a second wall 172, and a flange 174.

The first wall 170 is disposed substantially transverse to the second axis 146 and defines an inlet 180. The inlet 180 is disposed about the second axis 146 and is fluidly connected to the first port 60 via the feed line 76. The inlet 180 may be defined through a member 182 that extends from or through the first wall 170. The member 182 may define a valve seat.

The second wall 172 extends between the first wall 170 and the flange 174. The second wall 172 may be an annular wall or circumferential wall that extends from the first wall 170 towards the base 130.

The second wall 172 defines an outlet 190, a vent port 192, and a body shoulder 194. The outlet 190 is disposed proximate the first wall 170 and is fluidly connected to the second port 66 via the feed line 76. The outlet 190 is disposed transverse to the inlet 180 although alternative arrangements are also possible. The vent port 192 is spaced apart from the outlet 190 and is axially disposed, relative to the second axis 146, between the outlet 190 and the flange 174. The vent port 192 may be selectively exposed to ambient. The body shoulder 194 extends from an interior surface of the second wall 172 towards the second axis 146. The body shoulder 194 defines a central opening 196 that is disposed about the second axis 146.

The flange 174 radially extends from the second wall 172 away from the second axis 146. The flange 174 engages the base 130 and may engage the base flange 152.

The valve body 124 defines a valve cavity 200 and a vent cavity 202. The valve cavity 200 is at least partially defined by an interior surface of the second wall 172 and extends between the first wall 170 and the body shoulder 194. The valve cavity 200 is fluidly connected to the outlet 190. The vent cavity 202 is at least partially defined by an interior surface of the second wall 172 and extends between the body shoulder 194 and the flange 174 of the first body end 142 of the body 140 of the base 130. The vent cavity 202 is fluidly connected to the vent port 192.

The plunger assembly 126 extends between the actuator housing 120 and the valve body 124. The movement of the plunger assembly 126 moves the solenoid valve 24 between an open position that facilitates the fluid flow 80 to flow through the inlet 180 and through the outlet 190 and a closed position that inhibits the fluid flow 80 from flowing through the inlet 180 and the outlet 190.

The plunger assembly 126 includes a plunger 210 and a push rod 212.

The plunger 210 is disposed within the first cavity 160 such that the plunger 210 is disposed between the body 140 of the base 130 and the cap 122. The plunger 210 extends between a first plunger end 220 and a second plunger end 222 along the second axis 146.

The first plunger end 220 is disposed proximate and is spaced apart from the second body end 144 of the body 140 of the base 130 while the solenoid of the solenoid valve 24 is de-energized, as shown in FIG. 3, to define an air gap therebetween. The first plunger end 220 engages the second body end 144 of the body 140 of the base 130 while the solenoid of the solenoid valve 24 is energized, as shown in FIG. 4, to close the air gap and to move the plunger assembly 126 from the open position towards the closed position.

The second plunger end 222 is disposed proximate and faces towards the cap 122. A second cavity 230 is defined between the second plunger end 222 and the cap 122.

The push rod 212 is connected to the plunger 210 proximate the first plunger end 220. The push rod 212 extends from the plunger 210 along the second axis 146 and extends through the opening 150 and the central opening 196.

The push rod 212 includes a head 240, a skirt 242, and a leg 244. The head 240 is disposed within the valve cavity 200. The head 240 engages the body shoulder 194 to at least partially fluidly seal the central opening 196 while the solenoid valve 24 is in the open position. The head 240 engages the valve seat of the member 182 of the first wall 170 to at least partially fluidly seal the inlet 180 while the solenoid valve 24 is in the closed position. An end of the head 240 that faces towards the first wall 170 may define a pocket 246. Pocket 246 extends towards an end of the head 240 that selectively engages the body shoulder 194.

The skirt 242 radially extends from the head 240 towards the interior surface of the second wall 172. The skirt 242 may define a skirt port 248. The skirt 242 may be an annular or circumferential skirt having the leg 244. The leg 244 is disposed substantially parallel to the second axis 146 and slidably engages the interior surface of the second wall 172. The leg 244 extends towards the first wall 170.

A first biasing member 250 is disposed within the valve cavity 200 and extends between the first wall 170 and the skirt 242. The first biasing member 250 is arranged to bias the head 240 away from engagement with the valve seat to maintain the solenoid valve 24 in the open position.

A second biasing member 252 is disposed within the second cavity 230 and extends between the plunger 210 and the cap 122.

As shown in FIGS. 1 and 3, while the solenoid valve 24 is in the open position, the head 240 is spaced apart from the valve seat of the first wall 170 such that the inlet 180 is open and the head 240 seals the central opening 196. The fluid flow 80 from the pressurized container 12 is inhibited from flowing through the valve inlet 74 by the poppet 32 and is diverted to flow through the first port 60, through the feed line 76, through the inlet 180 and into the valve cavity 200, through the outlet 190, through the feed line 76, through the second port 66 and into the second chamber 104 to urge the poppet 32 along the first axis 44 towards the first position to seal the valve inlet 74. This arrangement pressure balances the poppet 32 of the pneumatic valve 22 to inhibit the fluid flow 80 from flowing between the valve inlet 74 and the valve outlet 62 towards the apparatus 14, while the solenoid valve 24 is in the open position.

As shown in FIGS. 2 and 4, the solenoid valve 24 may move towards the closed position responsive to a command or actuation to provide the fluid flow 80 to the apparatus 14. The air gap is closed as the head 240 is moved towards engagement with the valve seat of the first wall 170 such that the inlet 180 is closed and fluid flow 80 that is disposed within the vent cavity 202 is vented through the vent port 192 to ambient. The fluid flow 80 from the pressurized container 12 that is disposed within the second chamber 104 flows through the second port 66, through the feed line 76, through the outlet 190, into the valve cavity 200, through the skirt port 248, into the vent cavity 202, and out through the vent port 192. This enables the fluid flow 80 from pressurized container 12 to urge the poppet 32 along the first axis 44 towards the second position such that the fluid flow 80 may flow through the valve outlet 62 and into or towards the apparatus 14 to inflate the apparatus 14. In at least one embodiment, the solenoid valve 24 may be provided with permanent magnet latching features to ensure that the solenoid valve 24 is maintained in the closed position for a predetermined duration of time such that the head 240 of the plunger assembly 126 remains engaged with the valve seat of the first wall 170 to close the inlet 180. The solenoid valve 24 may move from the closed position towards the open position after the predetermined duration of time such that the pneumatic valve 22 moves from the second position towards the first position to inhibit further fluid flow 80 from flowing to the apparatus 14.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An electro-pneumatic valve assembly, comprising:
   a pneumatic valve, comprising:
   a pneumatic valve inlet arranged to receive fluid flow from a pressurized container;
   a valve housing having a wall extending along a first axis between a first end and a second end and an end wall disposed at the second end,
   the wall defining a pneumatic valve outlet and a first port and the end wall defining a second port;
   a poppet slidably disposed within the valve housing, movable between a first position that inhibits a fluid flow through the pneumatic valve outlet and a second position that facilitates the fluid flow through the valve pneumatic valve outlet; and
   a solenoid valve configured as a two position-three way valve having an inlet that is fluidly connected to the first port of the pneumatic valve, an outlet that is fluidly connected to the second port of the pneumatic valve, and a vent port, the solenoid valve being movable between an open position and a closed position, wherein:

while the solenoid valve is in the open position fluid flows from the pressurized container out of the first port in the pneumatic valve, into the inlet of the solenoid valve, out of the outlet of the solenoid valve, and into the second port of the pneumatic valve to urge the poppet towards the first portion; and while the solenoid vlave is in the closed position fluid flows out of the second port of the pnuematic valve, into the outlet of the solenoid valve, and out of the vent port, and further fluid flows from the pressurized container through the pneumatic valve inlet to urge the poppet towards the second position.

2. The electro-pneumatic valve assembly of claim 1, wherein the wall defines a first shoulder that extends towards the first axis.

3. The electro-pneumatic valve assembly of claim 2, wherein the pnuematic valve inlet is defined by the first shoulder.

4. The electro-pneumatic valve assembly of claim 3, wherein the valve housing defines an inlet chamber that extends between the first end and the first shoulder.

5. The electro-pneumatic valve assembly of claim 4, wherein the wall defines a second shoulder that extends away from the first axis and is spaced apart from the first shoulder.

6. The electro-pneumatic valve assembly of claim 5, wherein the valve housing defines a first chamber that extends between the first shoulder and the second shoulder.

7. The electro-pneumatic valve assembly of claim 6, wherein the valve housing defines a second chamber that extends between the end wall and the second shoulder.

8. The electro-pneumatic valve assembly of claim 7, wherein the first chamber has a first diameter and the second chamber has a second diameter that is greater than the first diameter.

9. The electro-pneumatic valve assembly of claim 7, wherein the poppet includes a poppet head that is slidably received within the second chamber and a poppet body that extends from the poppet head and is slidably received within the first chamber.

10. The electro-pneumatic valve assembly of claim 1, wherein the solenoid valve further comprises:
an actuator housing having a base defining an opening that extends along an axis and a cover assembly connected to the base and defining a first cavity that is disposed about the axis;
a valve body having a first wall that defines an inlet that is disposed about the axis, a second wall extending from the first wall and defines an outlet, and a flange extending from the second wall and engages the base; and
a plunger assembly movable along the axis between an open position that facilitates a fluid flow through the inlet and through the outlet and a closed position that inhibits the fluid flow through the inlet and the outlet.

11. The electro-pneumatic valve assembly of claim 10, wherein the second wall of the solenoid valve has a body shoulder that extends towards the axis and defines a central opening that is disposed about the axis.

12. The electro-pneumatic valve assembly of claim 11, wherein the valve body of the solenoid valve defines a valve cavity that extends between the first wall and the body shoulder.

13. The electro-pneumatic valve assembly of claim 12, wherein the second wall of the solenoid valve defines the vent port that is disposed between the body shoulder and the flange.

14. The electro-pneumatic valve assembly of claim 13, wherein the plunger assembly of the solenoid valve includes a plunger extending between a first plunger end and a second plunger end along the axis and a push rod connected to the first plunger end and extending through the opening and the central opening.

15. The electro-pneumatic valve assembly of claim 14, wherein the push rod of the solenoid valve has a head that engages the body shoulder to fluidly seal the central opening while the plunger assembly is in the open position and that engages a portion of the first wall to fluidly seal the inlet while the plunger assembly is in the closed position.

\* \* \* \* \*